(12) United States Patent
Parla et al.

(10) Patent No.: US 9,894,055 B2
(45) Date of Patent: *Feb. 13, 2018

(54) REDIRECT TO INSPECTION PROXY USING SINGLE-SIGN-ON BOOTSTRAPPING

(71) Applicant: Cisco Technology, Inc., San Jose, CA (US)

(72) Inventors: Vincent E. Parla, North Hampton, NH (US); David McGrew, Poolesville, MD (US); Andrzej Kielbasinski, Grafton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,003

(22) Filed: Jan. 29, 2016

(65) Prior Publication Data

US 2016/0149898 A1     May 26, 2016

Related U.S. Application Data

(63) Continuation of application No. 14/155,865, filed on Jan. 15, 2014, now Pat. No. 9,294,462.

(51) Int. Cl.
*G06F 7/04* (2006.01)
*H04L 29/06* (2006.01)

(52) U.S. Cl.
CPC .......... *H04L 63/0815* (2013.01); *H04L 63/04* (2013.01); *H04L 63/08* (2013.01); *H04L 63/0884* (2013.01)

(58) Field of Classification Search
CPC .............................. H04L 63/08; H04L 63/04

USPC .............................................................. 726/7
See application file for complete search history.

(56) References Cited

U.S. PATENT DOCUMENTS

| | | | |
|---|---|---|---|
| 7,793,342 | B1 | 9/2010 | Ebrahimi et al. |
| 8,127,008 | B2 | 2/2012 | Manning et al. |
| 8,214,635 | B2 | 7/2012 | Wang et al. |
| 8,484,241 | B2 | 7/2013 | Bouse et al. |
| 8,527,629 | B2 | 9/2013 | Manning et al. |
| 8,543,471 | B2 | 9/2013 | Salowey et al. |

(Continued)

OTHER PUBLICATIONS

Miller et al., "PKIX over Secure HTTP (POSH) draft-miller-posh-03", http://tools.ietf.org/html/draft-miller-posh-03, Nov. 12, 2013, 15 pages.

(Continued)

*Primary Examiner* — Teshome Hailu
(74) *Attorney, Agent, or Firm* — Edell, Shapiro & Finnan, LLC (57) ABSTRACT

An authentication request is generated when a user of a client device attempts to initiate a user session with an application managed by a service provider. An authentication response is generated based on credentials received from the user. The authentication response includes an assertion on behalf of the user. A delivery resource locator for the assertion is rewritten to a resource locator of a proxy in order to redirect the assertion to the proxy. The authentication response is sent to the client device together with the resource locator of the proxy in order to cause the client device to send the assertion to the proxy that decodes the re-written resource locator and sends the assertion to the service provider.

20 Claims, 8 Drawing Sheets

(56) References Cited

U.S. PATENT DOCUMENTS

| | | | |
|---|---|---|---|
| 8,572,708 B2* | 10/2013 | Barriga | H04L 63/0815 380/229 |
| 2004/0128538 A1* | 7/2004 | Gmuender | H04L 29/06 726/4 |
| 2006/0080238 A1* | 4/2006 | Nielsen | G06Q 20/102 705/40 |
| 2007/0101145 A1 | 5/2007 | Sachdeva et al. | |
| 2009/0178109 A1 | 7/2009 | Nice et al. | |
| 2009/0217354 A1* | 8/2009 | Blum | H04L 29/12594 726/3 |
| 2009/0249439 A1 | 10/2009 | Olden et al. | |
| 2009/0249440 A1 | 10/2009 | Platt et al. | |
| 2010/0115598 A1* | 5/2010 | Barriga | H04W 12/06 726/8 |
| 2011/0041165 A1 | 2/2011 | Bowen | |
| 2011/0162055 A1 | 7/2011 | Hinton et al. | |
| 2012/0096271 A1 | 4/2012 | Ramarathinam et al. | |
| 2012/0278487 A1* | 11/2012 | Woelfel | H04L 61/2596 709/226 |
| 2012/0278872 A1 | 11/2012 | Woelfel et al. | |
| 2013/0007867 A1 | 1/2013 | Sowatskey et al. | |
| 2013/0111549 A1 | 5/2013 | Sowatskey et al. | |
| 2013/0139241 A1 | 5/2013 | Leeder | |
| 2013/0219474 A1* | 8/2013 | Kuhnen | H04L 63/08 726/4 |
| 2013/0227099 A1 | 8/2013 | Hinton et al. | |
| 2013/0297700 A1 | 11/2013 | Hayton et al. | |
| 2015/0200924 A1 | 7/2015 | Parla et al. | |

OTHER PUBLICATIONS

CA Technologies, "Data Sheet CA SiteMinder", http://www.ca.com/us/~/media/Files/DataSheets/ca-siteminder.PDF, retrieved Dec. 4, 2013, 2 Pages.

International Search Report and Written Opinion in counterpart International Application No. PCT/US2015/010213, dated Mar. 19, 2015, 9 pages.

* cited by examiner

REDIRECT TO INSPECTION PROXY USING SINGLE-SIGN-ON BOOTSTRAPPING

CROSS-REFERENCE TO RELATED APPLICATIONS

This application is a continuation of U.S. patent application Ser. No. 14/155,865, filed on Jan. 15, 2014, and entitled "Redirect to Inspection Proxy Using Single-Sign-On Bootstrapping," the entire contents of which are hereby incorporated by reference.

TECHNICAL FIELD

The present disclosure relates to single-sign-on techniques for service provider applications.

BACKGROUND

Enterprise users are adopting more services in the cloud offered by various third party service providers. Users may access these service provider sites from mobile devices while outside the enterprise premises by connecting directly to the cloud resource. Enterprises would still like to inspect this type of traffic as part of their security policies (e.g. for data loss protection).

One of the challenges in doing this is finding a way to steer cloud traffic to a proxy layer to perform the inspection. This is particularly true on mobile device platforms. While one might be able to use access point name (APN) or virtual private network (VPN) technologies for some level of steering, it is often difficult to provision those solutions on a user's device in a way that can reliably enforce the traffic redirection. For example, APN techniques do not work at a Wi-Fi™ hotspot). Additionally, users do not want to have all of their traffic inspected, which is likely to be the case when device level techniques such as APN, VPN, or global hypertext transport protocol (HTTP) proxy configurations are used.

Most enterprise Software-as-a-Service (SaaS) solutions offer Single-Sign-On (SSO) techniques, to provide a way for enterprises to enforce authentication mechanisms associated with the enterprise. However, once the SSO transaction is complete, the traffic flows back directly to the cloud resource and enterprise visibility of the data is lost.

DESCRIPTION OF EXAMPLE EMBODIMENTS

Overview

An authentication request is generated when a user of a client device attempts to initiate a user session with an application managed by a service provider. An authentication response is generated based on credentials received from the user. The authentication response includes an assertion on behalf of the user. A delivery resource locator for the assertion is rewritten to a resource locator of a proxy in order to redirect the assertion to the proxy. The authentication response is sent to the client device together with the resource locator of the proxy in order to cause the client device to send the assertion to the proxy that decodes the re-written resource locator and sends the assertion to the service provider.

Example Embodiments

Figure 1:
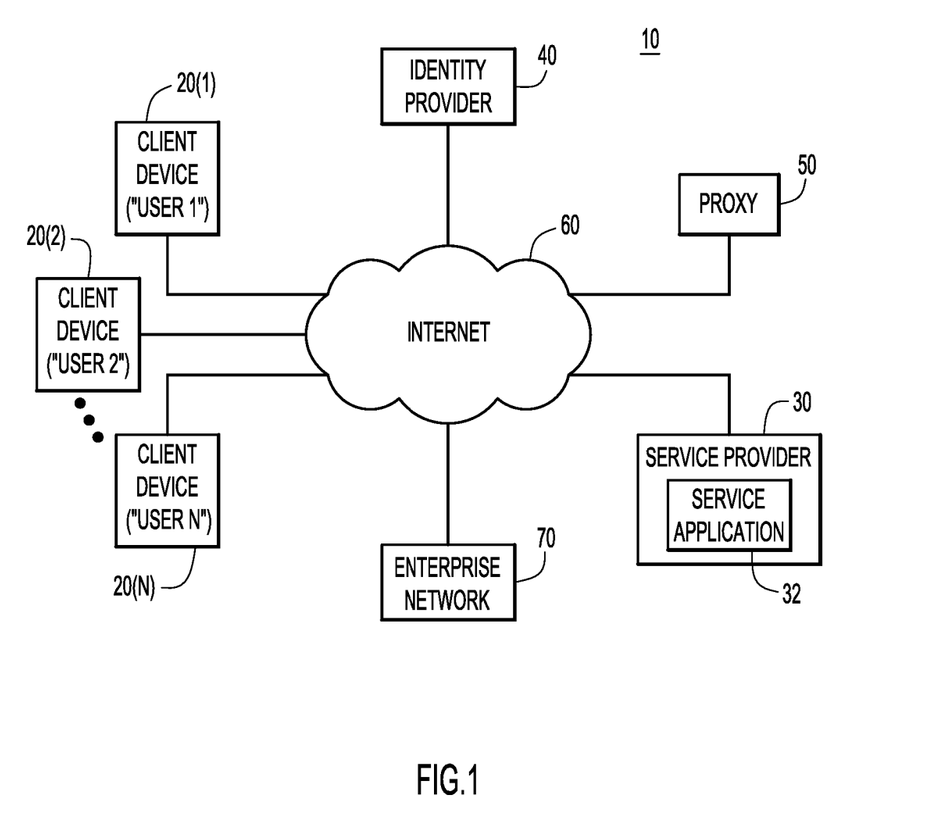
FIG. 1 is system diagram illustrating a plurality of client devices, a service provider, an identity provider, and a proxy, wherein the identity provider or service provider are configured to perform re-direction to the proxy according to the techniques presented herein.

Presented herein are techniques that build on existing single-sign-on technology to redirect a user through a reverse proxy that will perform security services when the user is accessing an enterprise cloud resource from a device. Referring first to FIG. 1, a system 10 is shown that includes a plurality of client devices 20(1)-20(N), each having an associated user, a service provider 30, an identity provider 40, and a proxy 50. The client devices 20(1)-20(N) may be desktop computers, laptop computers, tablet computers, wireless mobile devices, such as Smartphones, or any other physical or virtual computing device (e.g., a virtual machine running in a data center in the cloud).

The client devices 20(1)-20(N) may reside anywhere, and in so doing, communicate via the Internet shown at reference numeral 60. For example, one or more of the client devices 20(1)-20(N) may reside off-premises from an enterprise network 70, but according to the techniques presented herein, still have access to a service application 32 managed by the service provider 30. For example, the service application 32 may be an enterprise web conferencing application, a customer resource management application, etc.

The identity provider 40 is responsible for issuing identification information for all providers looking to interact/service with the service provider 30 in any possible way. To this end, the identity provider 40 performs authentication in order to verify a security token. Often, a user is authenticated only once (using single sign-on techniques) and a security token is passed along for processing by the identity provider 40 for each service provider application it needs to access. The identity provider 40 supports a variety of protocols, such as Security Assertion Markup Language (SAML), which is an XML-based open standard data format for exchanging authentication and authorization data between parties, in particular, between an identity provider and a service provider.

In one form, the service provider 30, identity provider 40 and proxy 60 may be embodied by dedicated server computers with Internet connectivity. In another form, the functions of one or more of the service provider 30, identity provider 40 and proxy 60 may be embodied by processes running in a data center in a cloud computing environment.

FIG. 1 shows that there is a user associated with each client device 20(1)-20(N). Specifically, there is User 1 associated with client device 20(1), User 2 associated with client device 20(2) and User N associated with client device 20(N). The user is typically a person that has access to a client device. There is an application on the client device that the user uses in order to access a service application maintained by the service provider 30. This application may be, for instance, a web browser application. However, this is only an example.

Figure 2:
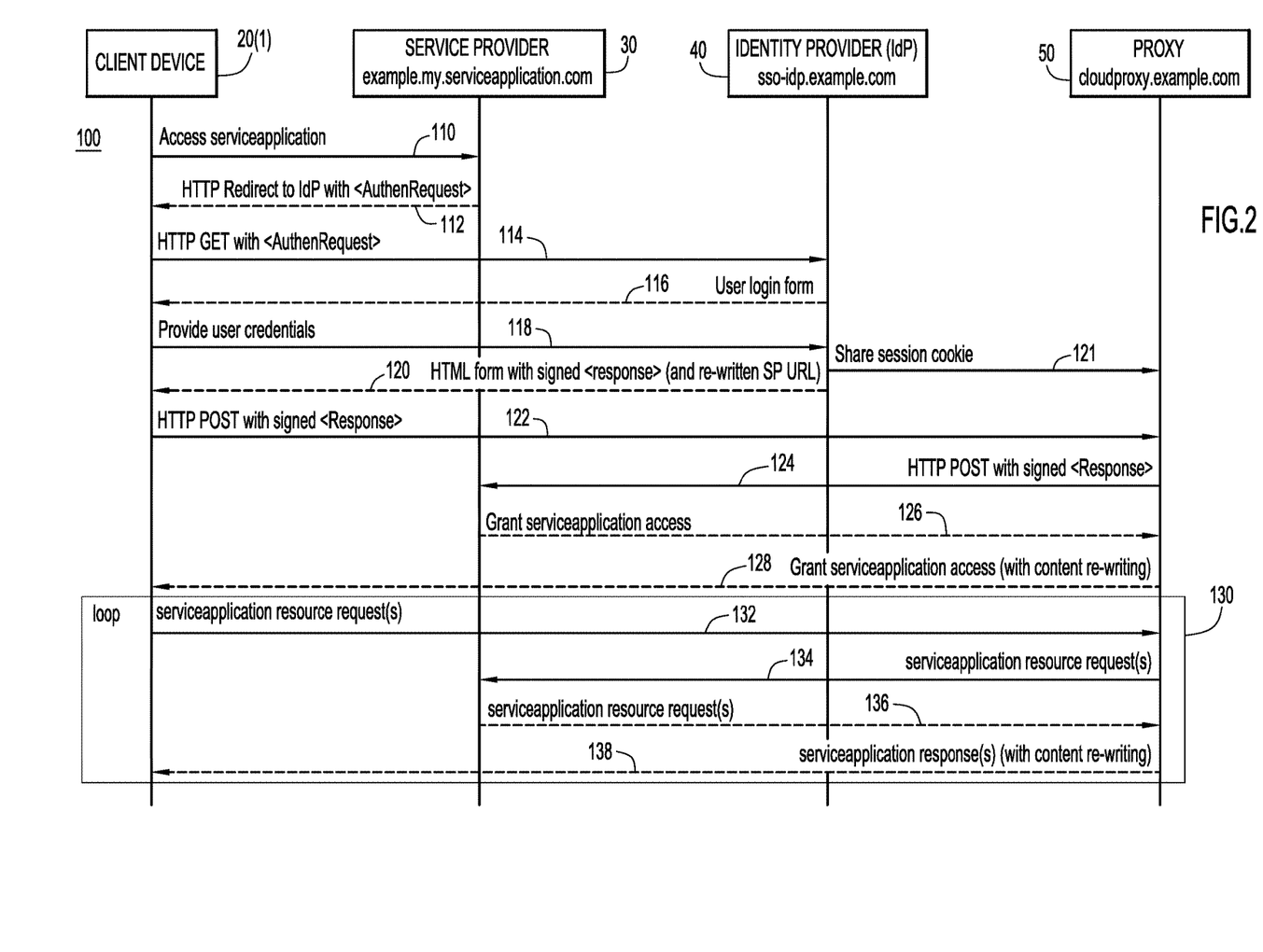
FIG. 2 is a ladder sequence diagram illustrating the operational flow according to the techniques presented herein.

Reference is now made to FIG. 2 for a description of the overall flow 100 according to the techniques presented herein. FIGS. 1 and 3A-3D are also referred to in connection with the description of FIG. 2. An enterprise, associated with the enterprise network 70, will enroll in a cloud service offered by the service provider 30, e.g., for service application 32. This will allow employee or contractor users of the enterprise to access the cloud service, e.g., service application 32. In the example described in connection with FIG. 2, the service application 32 is referred to as "serviceapplication". The Universal Resource Locator (URL) of the service application 32 is example.my.serviceapplication.com, for example. The URL of the proxy 50 is cloudproxy.example.com, for example.

An enterprise will enroll in a cloud service. During enrollment, the enterprise will create an authentication scheme for use by users associated with that enterprise. Typically this will be configuring the Universal Resource Locator (URL) of the single-sign-on (SSO) service that the enterprise is using. e.g., sso-idp.example.com.

Figure 3A:
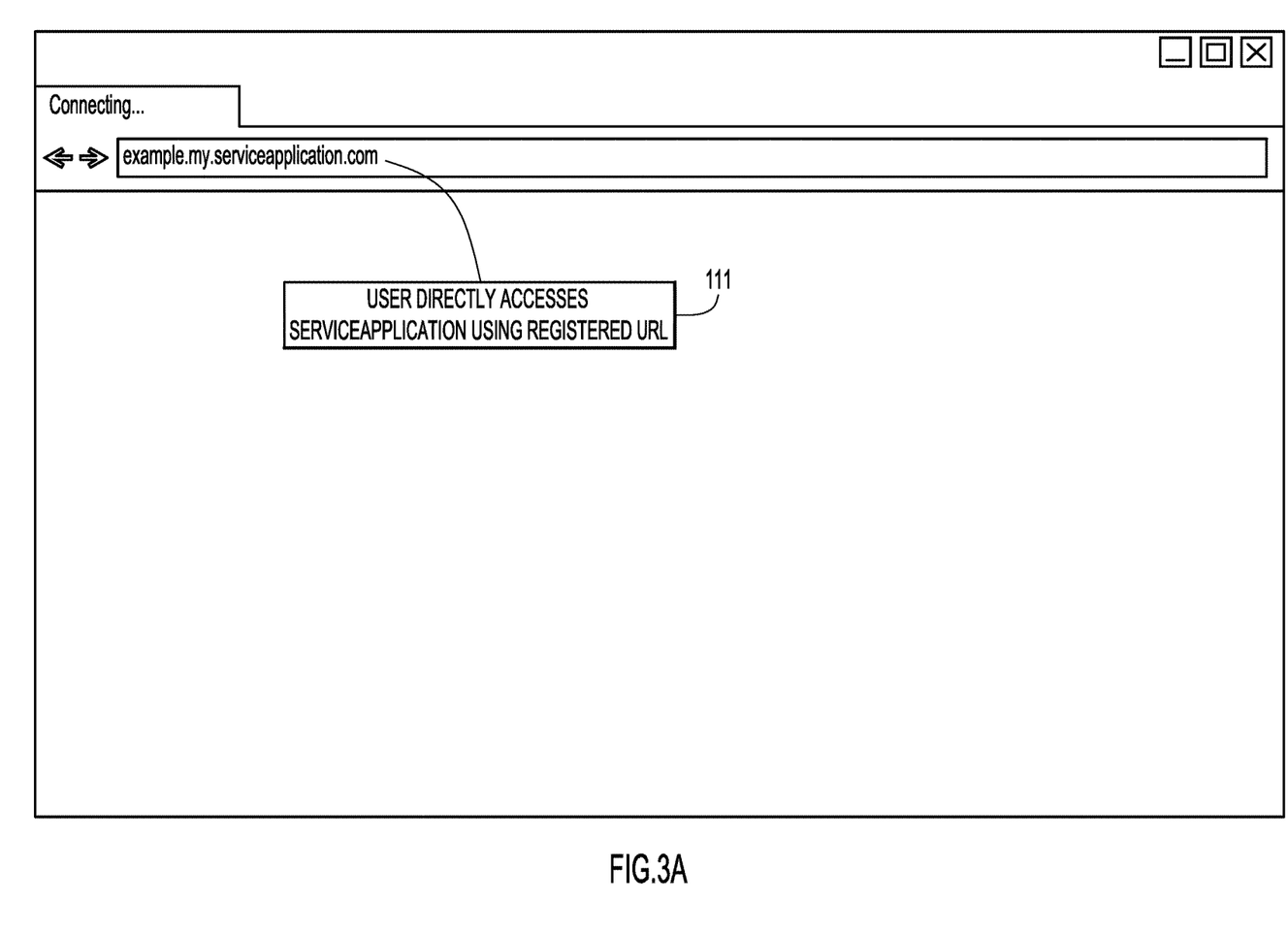
FIGS. 3A-3D are partial user interface screens illustrating an example of the user experience during the operation flow of the techniques presented herein.
Figure 3B:
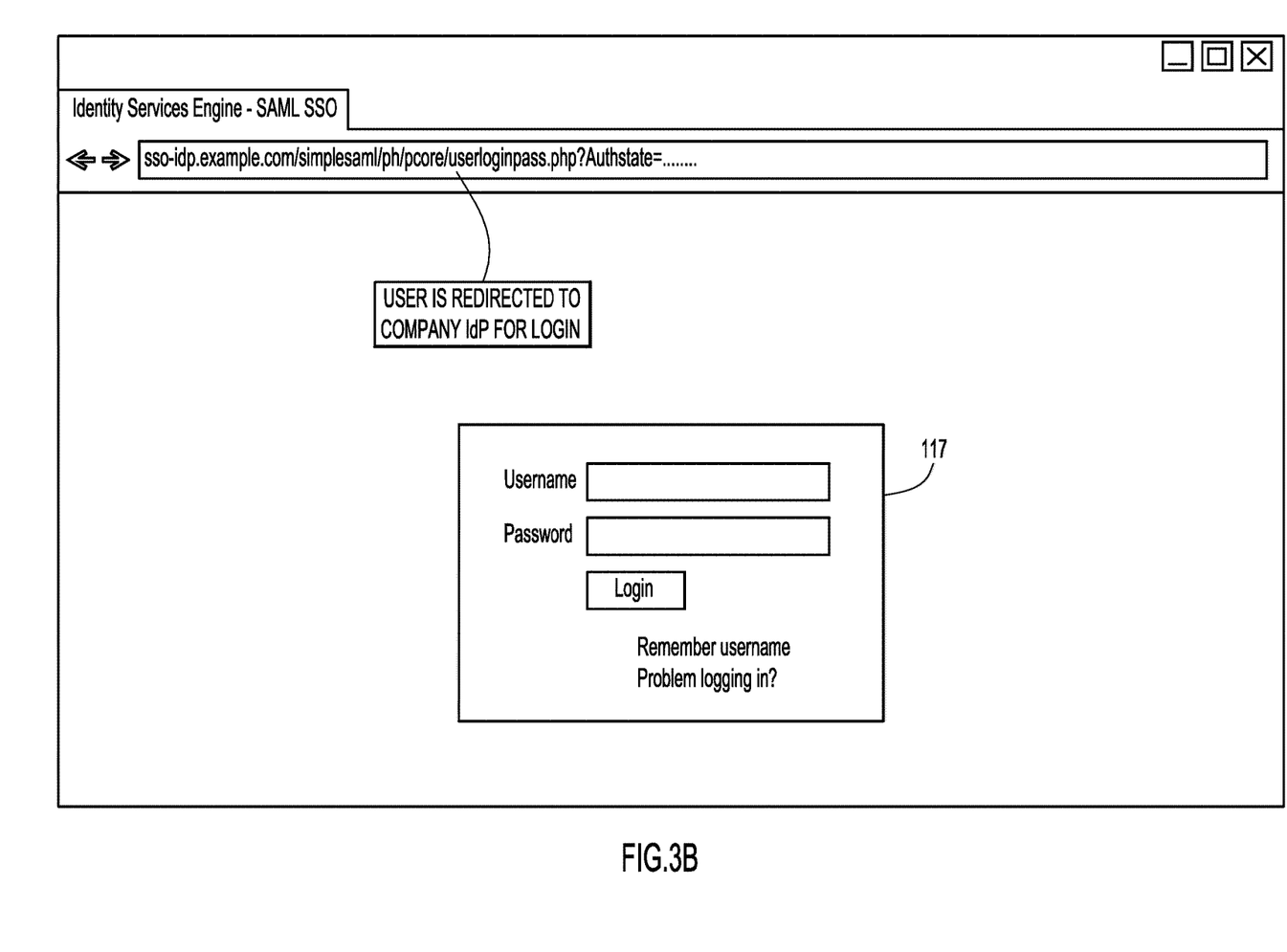

At 110, a user at a client device, e.g., at client device 20(1), directs a browser to example.my.serviceapplication.com for service provider-initiated SSO. FIG. 3A illustrates an example screen-shot of a browser during step 110. Reference numeral 111 shows a user's entry of "example.my.serviceapplication.com" in a browser running on client device 20(1). At 112, the browser running on the client device 20(1) is redirected to the identity provider for authentication at 114, using SAML HTTP Redirect or HTTP POST bindings. The re-direct at 112 contains an authentication request denoted <AuthenRequest>. At 114, browser running on the client device 20(1) makes an HTTP GET with the authentication request to the identity provider 40. At 116, the identity provider 40 responds to the authentication request with a user login form. FIG. 3B illustrates an example screen-shot of a browser at step 116, where the browser application running on the client device has been re-directed to the identity provider 40 and has been presented with a user login form shown at reference numeral 117. At 118, the user provides his/her user credentials into the login form and sends the credentials in the browser application to the identity provider 40. The identity provider can use a login form, two factor authorization, or even use an HTTP cookie from a previous authentication. There are many login scenarios that may be possible at 116 and 118, and the one described herein and shown in FIG. 3B is meant to be only one example.

If the user is authenticated based on his/her user credentials, then the identity provider 40 generates a response that includes an assertion on behalf of the user of the client device. In addition, the identity provider 40 rewrites a delivery resource locator, e.g., URL, for the assertion to a resource locator of the proxy 50 in order to redirect the assertion to the proxy 50. Thus, the browser application of the client device will be re-directed back to the service provider through the content rewriting inspection proxy 50 and include some meta-data such that the inspection proxy 50 can bridge the original request back to the original resource. At 120, the identity provider sends the response together with the re-written resource locator of the proxy 50.

When the browser application running on the client device 20(1) receives the response sent at 120, this causes the browser of the client device, at 122, to send the assertion to the proxy 50. Specifically, at 122, the browser at the client device 20(1), makes an HTTP POST with the response to the proxy 50. As noted in FIG. 2, the response sent at 120 may be signed by the identity provider, and this same signature is used when the response is re-directed to the proxy 50 at 122. It should be noted here that the proxy function may be performed by the same device as the identity provider, or by a separate device as shown in FIG. 2.

Figure 3C:
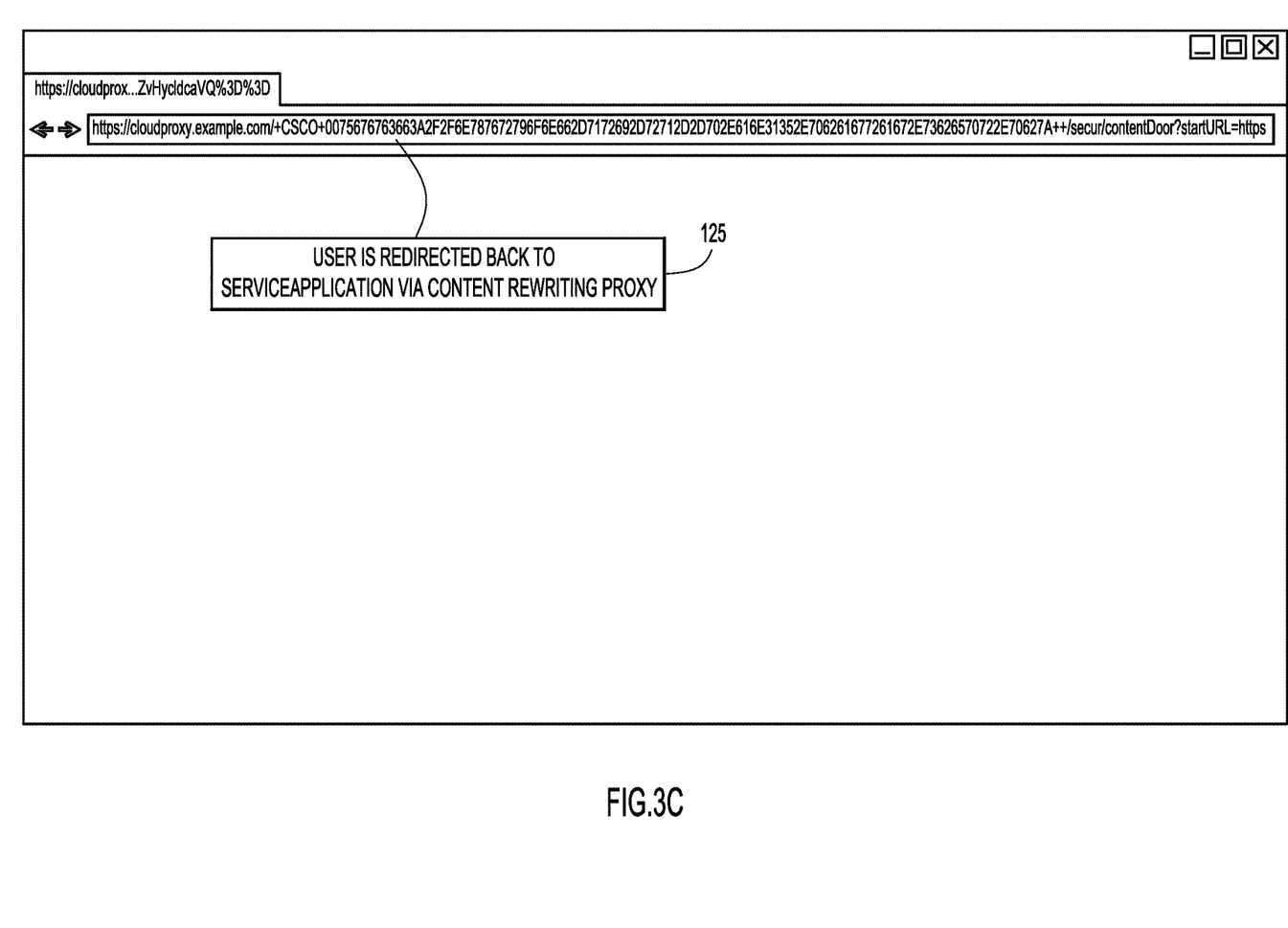

When the proxy 50 receives the re-directed response from the client device 20(1) at 122, the proxy decodes re-written resource locator and sends the assertion to the service provider at 124. This is shown by the HTTP POST that proxy 50 makes at 124 to the service provider 30. FIG. 3C illustrates an example screen-shot of a browser after steps 122 and 124, when the browser on the client device 20(1) is re-directed back to serviceapplication by the proxy 50 as shown at 125 in FIG. 3C.

Figure 3D:
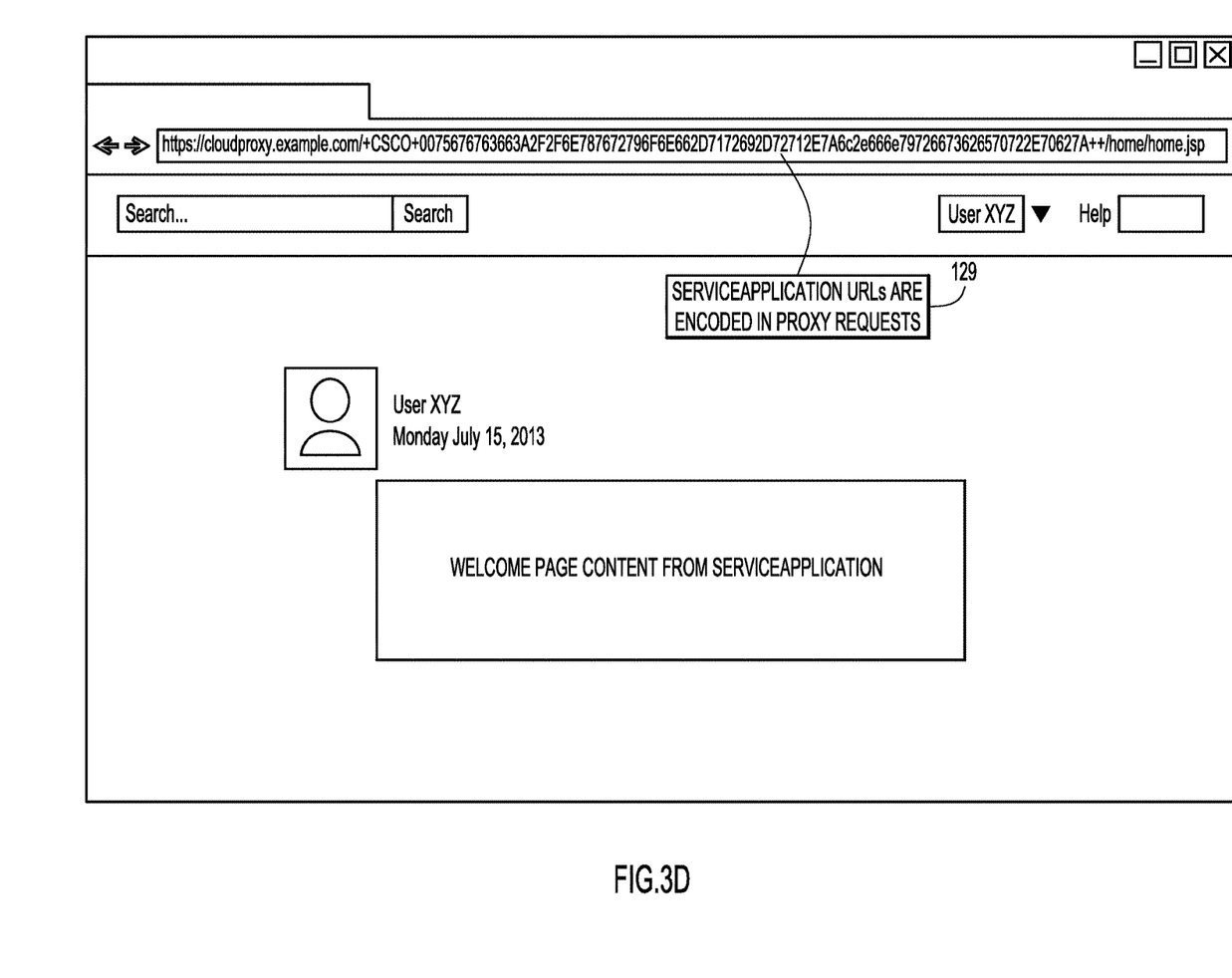

Thereafter, responses from the service provider 30 are received by the proxy 50, resource locators are re-written and content is propagated to the client device. Specifically, at 126, the service provider 30 grants the user access to serviceapplication. The proxy 50 performs content rewriting and notifies the client device at 128 of the access granted to serviceapplication. In performing content rewriting, the proxy 50 takes any content it received from the service provider 30 and rewrites it to a page that it sends back to the client device. FIG. 3D shows an example screen-shot of a user browser running on the client device after content rewriting at step 128, and presenting "User XYZ" with an initial welcome page to serviceapplication. As noted in FIG. 3D, the serviceapplication URLs are encoded in any proxy requests as shown at reference numeral 129.

Thereafter, a loop 130 is performed during which exchanges that the browser application running on the client device 20(1) has with the serviceapplication occur via the proxy. That is, having learned at 128 that resource requests to serviceapplication need to be made to the proxy, at 132, the browser application on the client device 20(1) sends a resource request to proxy 50. Proxy 50 sends the resource request to the service provider at 134. The service provider sends its resource response at 136 to the proxy. At 138, the proxy performs content rewriting and sends the resource response to the client device.

The user's SSO credential is posted to the proxy at 122, and thereafter these credentials are valid to access the serviceapplication no matter which entity obtains them, within some limited timeframe. The main verification performed by the service provider is against the contents of the cryptographically secured SAML Response/assertion (which the proxy does not modify). The service provider will verify that source against its own configurations, without taking into account Layer 2 or Layer 3 addresses. The SAML assertion may contain information sent by the identity provider regarding subject locality (identity provider sends an Internet Protocol (IP) address of client system from which it authenticated the end user). This is an optional field and it is generally ignored by service providers (network address translation and web proxies make it difficult to use in practice). Nevertheless, if required, the identity provider, which redirects through the proxy, can generate the subject locality field to indicate the IP address of the proxy from which requests to the service provider will originate. Independent of SAML/SSO/authentication, service providers may restrict access to the service through IP whitelists/blacklists of the client IP address/network. The proxy IP address would need to be white-listed in this scenario.

Using these techniques, the enterprise is able to inspect the cloud traffic (by way of the proxy 50) even when a user is accessing the service provider using a client device at a location outside of the enterprise network, i.e., "off-prem." Moreover, the identity provider, service provider and proxy may also be off-prem.

Thus, the process flow involves a user initiating a connection directly to a service provider, and "hi-jacking" or intercepting the session at a proxy. The interaction begins by a user attempting to connect to a service provider. It is irrelevant where the client device is located when it attempts to initiate a session for a user with the service provider. The client device may be within the enterprise network ("on-prem") or off-prem. This is achieved in a totally standards-based manner without any special software on the client device. The identity provider informs the client device, instead of going back to service provider, to go to the proxy.

Proxy Authentication

To avoid hosting an open proxy on the Internet, the identity provider may authenticate the user session, transparently, to the proxy. Examples of how this authenticated session could be accomplished include:

1. Sharing a session HTTP cookie between the identity provider and proxy (if they are part of the same domain). This is shown at reference numeral 121 in FIG. 2. To be more specific, the session HTTP cookie is sent by the identity provider 40 at 120 and echoed back by client device 20(1) to proxy 50 in 122.

2. The proxy establishing the authenticated session based on the SAML assertion destined for the service provider (step 122 above).

To summarize, authenticating the user session to the proxy may involve sharing a session cookie between the identity provider and the proxy, or the proxy analyzing the assertion received from the user.

Reverse Proxy Techniques

Resource locator rewriting would be performed by the identity provider 40 and proxy 50 to force (cause) the browser application running on the client device to access all service provider web pages and linked content through the proxy 50. URLs to access through the proxy could be obfuscated and embedded in the proxy URL, for example to access https://example.my.serviceapplication.com/home/home.jsp through the proxy: https://cloudproxy.example.com/+CSCO+0075676763663A2F2F6E787672796F6E-662D7172692D72712E7A6C2E666E79726673362657072-2E70627A++/home/home.jsp URL rewriting may be challenged for all content, such as custom JavaScript exchanges that embed URLs or Java applets that use sockets to hardcoded addresses.

As part of the user's session, the proxy 50 can maintain state for proxied content, such as HTTP cookies set by the service provider. For example, a session cookie set by serviceapplication in step 126 would be preserved by the proxy 50. It would be omitted in step 128 and re-added in outgoing request in step 134.

Preventing Direct Access to Service Provider

Some additional consideration is required if the client device should be prevented from accessing the service provider directly. Since the SAML assertion normally passes through the client device's browser, a user could perform their own content rewrite to post the assertion directly to the service provider, gaining direct access. This could be prevented in several ways. First, the identity provider 40 can encrypt the assertion in step 120 with a shared secret also known by the proxy 50, requiring the proxy 50 to decrypt it before it forwards the assertion to the service provider 30.

Second, the identity provider 40 could generate the assertion in a way that would require the proxy 50 to rewrite and re-sign it before it would be accepted by the service provider 30. In other words, the identity provider 40 will generate an assertion that is trusted by the proxy but not by the service provider (such as with a different certificate, or with different entity identifier). The proxy can perform some modification that would satisfy the service provider SAML configuration.

These same techniques can be applied to identity provider initiated SSO. The only difference in this scenario is that the user initiates the SSO process directly with the identity provider in step 110, instead of with the service provider.

The redirection of traffic through the inspection proxy may also be performed earlier, during redirection from service provider to identity provider in steps 112 and 114. In this scenario, since the service provider will set the proxy as the target of the authentication request, the proxy may be required to modify and re-sign the SAML request to allow the identity provider to view the authentication request as targeting it rather than the proxy.

Figure 4:
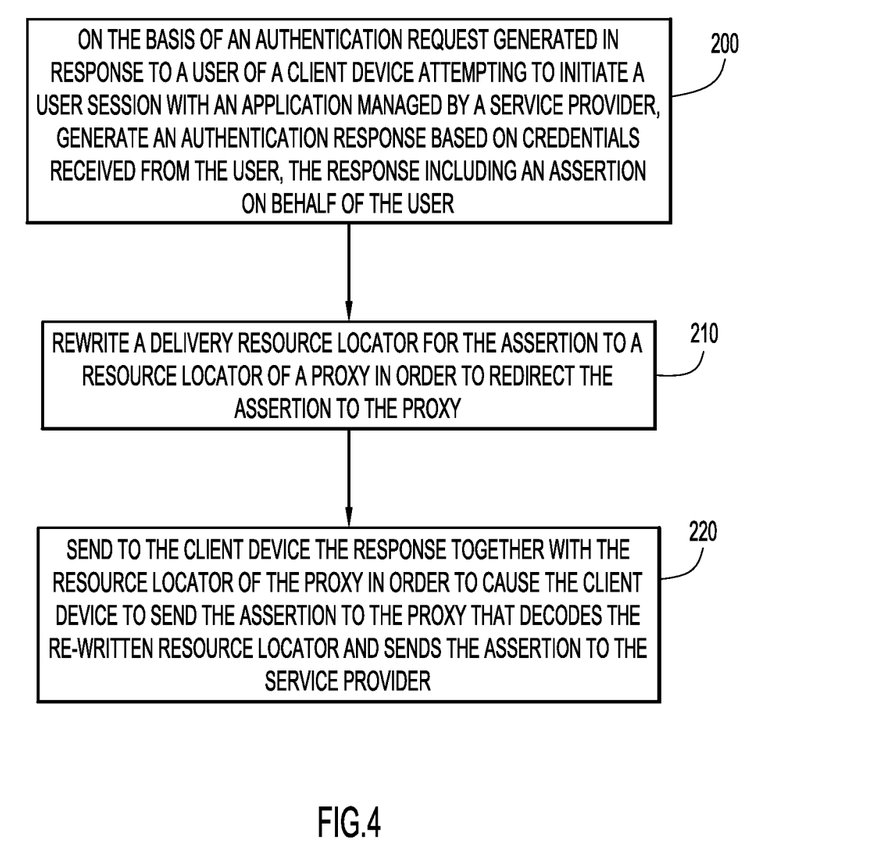
FIG. 4 is a flow chart summarizing the operations performed by an identity provider or service provider to facilitate the techniques presented herein.

FIG. 4 is a flow chart that summarized the operations performed according to the techniques described above in connection with FIGS. 1, 2 and 3A-3D. These operations may be performed by the identity provider 40, and also, in some cases and in some portions, by the service provider 30. At 200, on the basis of an authentication request generated in response to a user of a client device attempting to initiate a user session with an application managed by a service provider, an authentication response is generated based on credentials received from the user. The authentication response includes an assertion on behalf of the user. At 210, a delivery resource locator (e.g., URL) for the assertion is re-written to a resource locator of a proxy in order to redirect the assertion to the proxy. At 220, the authentication response is sent to the client device, together with the resource locator of the proxy in order to cause the client device to send the assertion to the proxy. The proxy, when it receives the response, decodes the re-written resource locator and sends the assertion to the service provider. As explained above, all of the steps depicted in FIG. 4 may be performed by an identity provider, or some may be performed by the service provider. Under normal SAML operations, the service provider redirects to the identity provider directly. However, the service provider could be configured to direct to the identity provider via the proxy. The service provider does not really "know" it is redirecting to a proxy; it sees the proxy as the identity provider in that case.

Figure 5:
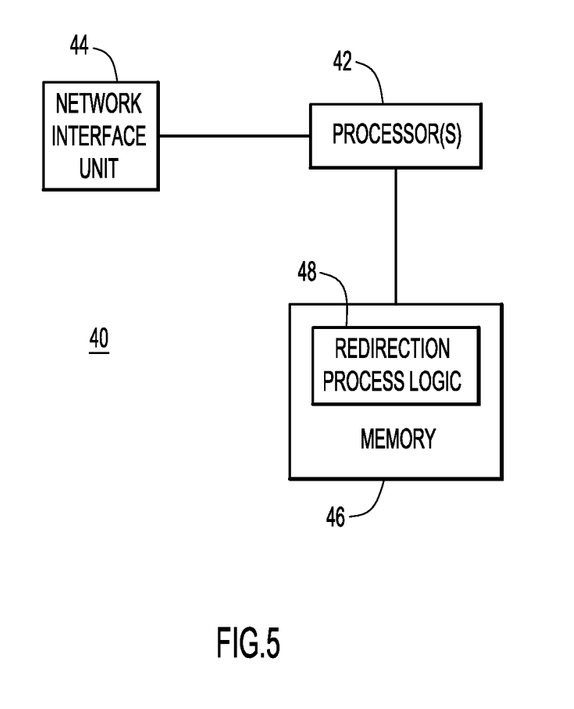
FIG. 5 is an example of a block diagram of an identity provider configured to facilitate the techniques presented herein.

Reference is now made to FIG. 5. FIG. 5 illustrates an example block diagram of identity provider 40. The identity provider 40 may be embodied as a physical apparatus having network connectivity and computing capabilities. To this end, in one form, the identity provider 40 includes one or more processors 42, a network interface unit 44 and memory 46. The processor 42 may comprise a microprocessor or microcontroller. The network interface unit 44 may comprise one or more network interface cards or similar network connectivity enabling devices to enable the identity provider 40 to communicate over the Internet with the service provider 30, client devices, and proxy 50, as well as other entities as needed. The memory 46 stores software that is executed by the processor 42, for example, instructions for redirection and content rewriting process logic 48.

Memory 46 may comprise read only memory (ROM), random access memory (RAM), magnetic disk storage media devices, optical storage media devices, flash memory devices, electrical, optical, or other physical/tangible memory storage devices. Thus, in general, the memory 48 may comprise one or more tangible (non-transitory) computer readable storage media (e.g., a memory device) encoded with software comprising computer executable instructions (e.g., for redirection process logic 48) and when the software is executed (by the processor 42) it is operable to perform the operations described for the identity provider 40 in connection with FIGS. 1, 2, 3A-3D and 4.

One or more functions of the identity provider 40 and proxy 50 may be implemented in the same physical apparatus (i.e., "box") or executed by the same cloud-hosted function.

There are numerous advantages associated with the techniques presented herein. First, the client device need not be inside the corporation/enterprise network in order to access the service provider application. The client device can be anywhere, and in particular these techniques are particularly useful when the client device is outside the corporation/ enterprise network, e.g., at home or away from corporate network. Moreover, the identity provider and proxy need not be in the corporate network.

Second, these techniques are completely transparent to the user in that the user does not need to do anything differently. The user accesses the service provider application as he/she normally does, e.g., through a browser and pointing to the URL of the service provider (or identity provider as the case may be). The majority of the intelligence to enable these techniques resides in the identity provider to make the redirect to the proxy. The "hijack" or "interception" occurs on the back-end at the identity provider, and is completely transparent to the user. Once logged into the service provider, the user may notice that the server address is not the service provider directly, but in fact the address of some other server.

The browser security is not affected because these techniques use standard HTTP redirection to another site as part of the SAML flow. In the typical SAML flow the user agent (browser) may be redirected (through HTTP POST and HTTP Redirect SAML bindings) to various sites other than the original as part of a normal SSO process. When the SSO process redirects the browser to the proxy, the proxy is terminating that secure sockets layer (SSL) connection and presenting its own valid server certificate to the client browser. The proxy is then acting as a client and establishing a new HTTPS session to serviceapplication.com. The proxy is also responsible for performing the server certificate validation for the requests that it issues on behalf of the client browser. These techniques may, therefore, be more secure because the proxy can apply its own verification policy that may be stricter (for example, no untrusted certificates, which users may typically click through).

If there is concern that a user might see this in the browser, the service provider host may be encoded in the domain name of the proxy, where https://<service provider host>.<company domain>/<obfuscated service provider protocol and path> would result in a proxy request to <service provider protocol>://<service provider host>/<service provider path>. For example https://www.serviceapplication.example.com/<path> would map to http[s]://www.serviceapplication.com/<path>.

Third, these techniques are achieved in a manner that is totally standards-compliant. Standards-based protocols are used, and are not changed in any way. No special client-side software is needed. There are no violations of any trust relationships, and no warnings pop-up in a web browser on a client device. The web browser will trust the intercepted connection. The proxy bridges the secure connection between the client device and the service provider in a way that does not result in any security warnings in the browser at the client device.

Further, any of the components can be on-pre or off-prem. That is, the client device/endpoint can be on-prem or off-prem, the identity provider and proxy can also be on-prem or off-prem (cloud-hosted). The proxy function may be performed by the same device that performs the functions of the identity provider, or in a separate device/cloud-hosted instantiation.

Further still, no predetermined relationship need exist between the proxy and any of the service providers. All that is needed is the normal configuration for SAML that exists between the identity provider, which performs the final binding/redirect through the proxy, and the service provider. Even if serviceapplication.com uses strict host transport security and certificate pinning, the user agent contacting serviceapplication.com is the proxy (not the end user browser), which could honor strict host transport security and certificate pinning policies. The connection between end user browser and proxy is a separate SSL tunnel.

To summarize, in one form, a method is provided comprising: on the basis of an authentication request generated in response to a user of a client device attempting to initiate a user session with an application managed by a service provider, generating an authentication response based on credentials received from the user, the authentication response including an assertion on behalf of the user; rewriting a delivery resource locator for the assertion to a resource locator of a proxy in order to redirect the assertion to the proxy; and sending to the client device the authentication response together with the resource locator of the proxy in order to cause the client device to send the assertion to the proxy that decodes the re-written resource locator and sends the assertion to the service provider In another form, a method is provided comprising: receiving at an identity provider an authentication request generated in response to a user of a client device attempting to initiate a user session with an application managed by a service provider; generating an authentication response based on credentials received from the user, the response including an assertion on behalf of the user; rewriting a delivery resource locator for the assertion to a resource locator of a proxy in order to redirect the assertion to the proxy; sending to the client device the authentication response together with the resource locator of the proxy in order to cause the client device to send the assertion to the proxy.

Still further, an apparatus is provided comprising: a network interface unit configured to send and receive communications over a network; and a processor coupled to the network interface unit, wherein the processor is configured to: on the basis of an authentication request generated in response to a user of a client device attempting to initiate a user session with an application managed by a service provider, generate an authentication response based on credentials received from the user, the response including an assertion on behalf of the user; rewrite a delivery resource locator for the assertion to a resource locator of a proxy in order to redirect the assertion to the proxy; supply the authentication response to the network interface unit to be sent to the client device together with the resource locator of the proxy in order to cause the client device to send the assertion to the proxy.

The above description is intended by way of example only. Various modifications and structural changes may be made therein without departing from the scope of the concepts described herein and within the scope and range of equivalents of the claims.

What is claimed is:

1. A method comprising:
   based on an authentication request generated in response to a user of a client device attempting to initiate a user session with a service provider and the user session being redirected by the service provider to an identity provider and the identity provider redirecting the user session to a proxy server, receiving, by the proxy server, a session cookie used to authenticate the user session from the identity provider;
   sending, by the proxy server, an assertion on behalf of the user to the service provider;
   receiving, by the proxy server, resource requests for service provider web pages and linked content from the client device;
   forwarding, by the proxy server, the resource requests to the service provider;
   receiving, at the proxy server, the service provider web pages and linked content from the service provider;
   rewriting, by the proxy server, the service provider web pages and linked content to cause the client device to access the service provider web pages and linked content through the proxy server; and
   sending, by the proxy server, rewritten service provider web pages and linked content to the client device.

2. The method of claim 1, wherein rewriting comprises rewriting the service provider web pages and linked content to a resource locator served by the proxy server, and wherein sending comprises sending the resource locator to the client device.

3. The method of claim 1, wherein the service provider web pages and linked content comprises content generated by one or more service provider applications.

4. The method of claim 1, further comprising analyzing the assertion to determine whether the user session is authenticated.

5. The method of claim 1, further comprising receiving, from the service provider, an access grant indicating that the user is to be given access to the service provider.

6. The method of claim 1, wherein the service provider web pages and linked content of the service provider are enrolled by an enterprise associated with an enterprise network.

7. The method of claim 6, wherein the client device requests the service provider web pages and linked content while residing off-premises from the enterprise network.

8. An apparatus comprising:
   a network interface unit configured to send and receive communications over a network;
   a processor coupled to the network interface unit, wherein the processor is configured to:
      on the basis of an authentication request generated in response to a user of a client device attempting to initiate a user session with a service provider and the user session being redirected by the service provider to an identity provider and the identity provider redirecting the user session to a proxy server, receive from the identity provider a session cookie used to authenticate the user session;
      send an assertion on behalf of the user to the service provider;
      receive resource requests for service provider web pages and linked content from the client device;
      forward the resource requests to the service provider;
      receive the service provider web pages and linked content from the service provider;
      rewrite the service provider web pages and linked content to cause the client device to access the service provider web pages and linked content through the proxy server; and
      send rewritten service provider web pages and linked content to the client device.

9. The apparatus of claim 8, wherein the processor is configured to rewrite the service provider web pages and linked content to a resource locator served by the proxy server, and wherein the processor is configured to send the resource locator to the client device.

10. The apparatus of claim 8, wherein the service provider web pages and linked content comprises content generated by one or more service provider applications.

11. The apparatus of claim 8, wherein the processor is configured to analyze the assertion to determine whether the user session is authenticated.

12. The apparatus of claim 8, wherein the processor is further configured to receive, from the service provider, an access grant indicating that the user is to be given access to the service provider.

13. The apparatus of claim 8, wherein the service provider web pages and linked content of the service provider are enrolled by an enterprise associated with an enterprise network.

14. The apparatus of claim 13, wherein the client device requests the service provider web pages and linked content while residing off-premises from the enterprise network.

15. One or more non-transitory computer readable storage media encoded with software comprising computer executable instructions, and when the software is executed, operable to:
   receive, by a proxy server, a session cookie from an identity provider, the session cookie being used to authenticate a user session of a user of a client device after an authentication request is generated in response to the user attempting to initiate the user session with a service provider and the user session is redirected by the service provider to the identity provider and the identity provider redirecting the user session to the proxy server;
   send, by the proxy server, an assertion on behalf of the user to the service provider;
   receive, by the proxy server, resource requests for service provider web pages and linked content from the client device;
   forward, by the proxy server, the resource requests to the service provider;
   receive, at the proxy server, the service provider web pages and linked content from the service provider;
   rewrite, by the proxy server, the service provider web pages and linked content to cause the client device to access the service provider web pages and linked content through the proxy server; and
   send, by the proxy server, rewritten service provider web pages and linked content to the client device.

16. The computer readable storage media of claim 15, wherein the instructions operable to rewrite comprises instructions operable to rewrite the service provider web pages and linked content to a resource locator served by the proxy server, and wherein the instructions operable to send comprises instructions operable to send the resource locator to the client device.

17. The computer readable storage media of claim 15, wherein the service provider web pages and linked content comprises content generated by one or more service provider applications.

18. The computer readable storage media of claim 15, wherein the instructions are further operable to:
   analyze the assertion to determine whether the user session is authenticated.

19. The computer readable storage media of claim 15, wherein the instructions are further operable to:
   receive, from the service provider, an access grant indicating that the user is to be given access to the service provider.

20. The computer readable storage media of claim 15, wherein the service provider web pages and linked content of the service provider are enrolled by an enterprise associated with an enterprise network, and the client device requests the service provider web pages and linked content while residing off-premises from the enterprise network.

\* \* \* \* \*